United States Patent Office 2,825,006
Patented Feb. 25, 1958

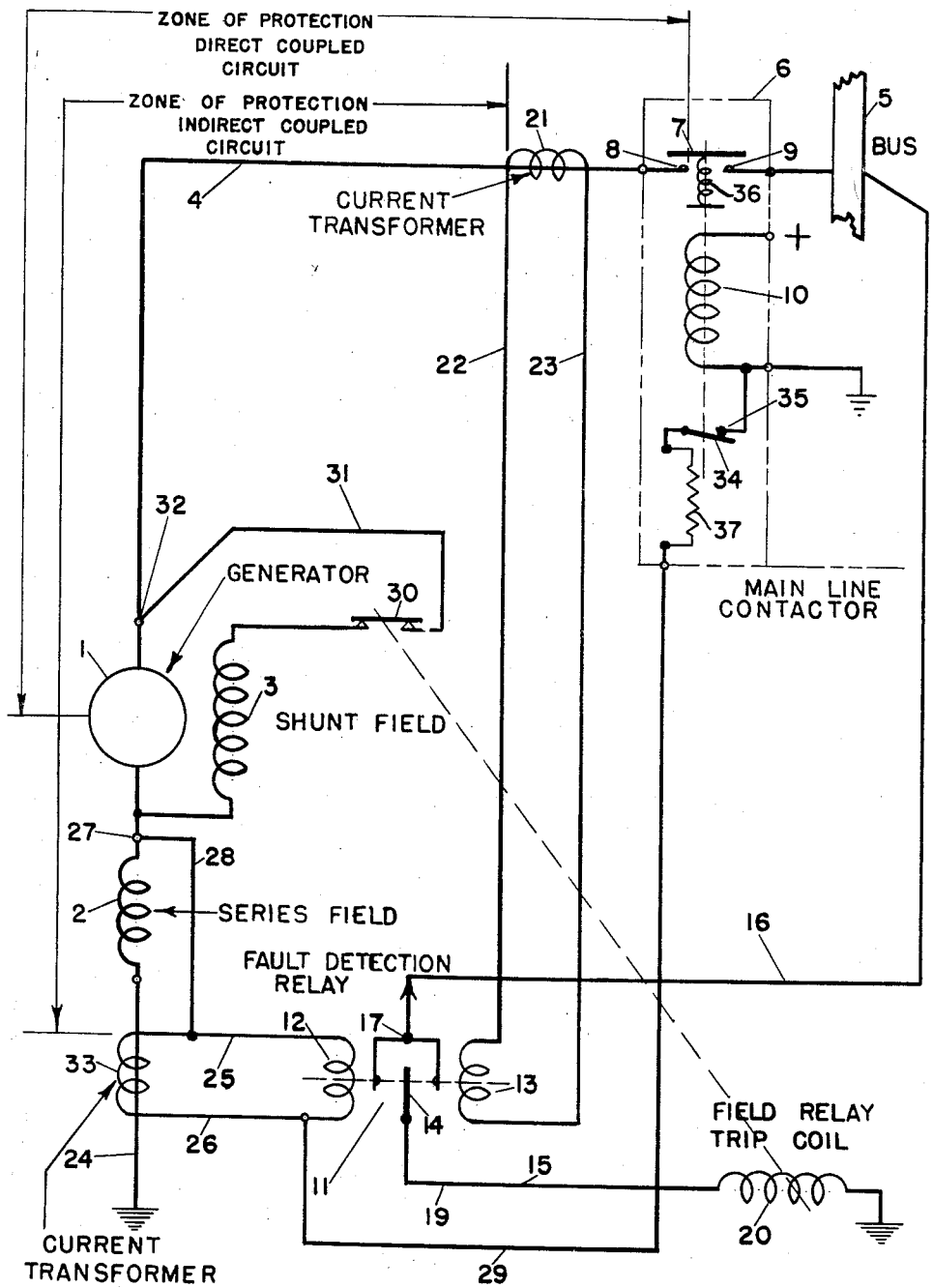

2,825,006

GROUND FAULT PROTECTOR

Ralph J. Leppla, Maple Heights, Ohio, assignor to Jack & Heintz, Inc., Cleveland, Ohio, a corporation of Delaware Application May 29, 1953, Serial No. 358,395

5 Claims. (Cl. 317—13)

This invention relates in general to electrical systems employing a plurality of engine driven generators, such as utilized in aircraft, and more particularly to an improved protective system for such electrical systems and generators.

The primary object of the invention is to provide an improved ground fault protection system for a generator and the feeder circuit connected thereto.

Another object of the invention is to provide a ground fault protection system for a generator and the feeder circuit connected thereto, which will positively deenergize the generator during its initial build-up period or during normal operation upon the occurrence of a fault in the generator or in the feeder circuit.

A more specific object of this invention is to provide a ground fault protection system for a generator and the feeder circuit connected thereto which utilizes a relay operative through direct and inductive coupling circuits to cause a cutout of the generator field winding upon the occurrence of a fault in the generator or the system.

With the foregoing and other objects in view, the invention resides in the combination of parts and in the details of construction set forth in the following specification and appended claims with a certain embodiment thereof being illustrated in the accompanying drawing, which is a schematic circuit diagram showing one form that the invention may take.

Referring particularly to the drawings, a D. C. generator 1 having a series field winding 2 and a shunt field winding 3, is illustrated as being connected by line 4 to the feeder cable or bus 5. Interposed in line 4 is a main contactor or relay 6 with a bridging arm 7 arranged to connect contact terminals 8 and 9 when operating coil 10 is energized. The bridging arm 7 will disconnect the generator 1 from feeder 5 under the biasing action of a suitable spring, such as that shown at 36, when coil 10 is deenergized.

Interposed between the negative side of generator and the feeder bus 5 is a ground fault relay 11 of the non-polarized type. The relay 11 has a pair of operating coils 12 and 13 which oppose each other under normal load switching transients. When a fault occurs, the two coils are unbalanced due to unequal current flow in the current transformer primaries and the contacts of relay 11 close the normally open circuit 15. The circuit 15 comprises the line 16 connected to feeder bus 5, terminal 17 of relay 11, line 19 connectable through contact 14 to the terminal 17 and a generator field relay trip coil 20.

Operating coil 13 is indirectly, or inductively, coupled to line 4 by means of a current transformer 21 through lines 22 and 23. Operating coil 12 is connected through lines 25 and 26 to current transformer 33 which inductively or indirectly connects to line 24 leading from the series field 2 of the generator to ground. Also the coil 12 is directly coupled on one side to the negative brush 27 of the generator through lines 28 and 25. The other side of coil 12 is directly connected by line 29 to the main contactor 6 and then to ground through a resistor 37 and the normally closed contacts 34 and 35.

In series with shunt field 3 of the generator 1 is a normally closed relay contact 30, which becomes operative to open the shunt field circuit when actuated by field trip coil 20. The relay contact 30 is illustrated as being connected in line 31 between the winding 3 and the positive generator brush 32.

The fault protection provided by the relay 11 with respect to the current transformer 33 and 21 is well known. The feeder lines 4 and 24 are passed through the openings in the cores of the current transformers 21 and 33 respectively. The feeder lines then act as the primaries of the current transformers. Since in a current transformer the primary and the secondary are indirectly coupled, the current in the secondary is dependent upon the rate of change of load current in the primary. The secondaries of the two current transformers 21 and 33 are connected to opposing coils 13 and 12 respectively of relay 11. Operation of the relay 11 depends upon a differential between signals to the two opposing coils, and therefore the detection of a ground fault in the zone of protection afforded between the two transformers depends upon a differential in the rate of current change in the transformer primaries.

The protection thus afforded to electrical systems of this nature is quite adequate for normal running conditions of the generator. However, the build-up period of a generator will be increased substantially if a ground fault is present on a feeder line and therefore the rate of current change in the transformer primaries will be decreased. Such a condition will render the indirectly coupled circuit fault relay 11 inadequate for protection purposes during the generator build-up period.

To insure that faults present during generator build-up are detected in the zone of protection shown for the direct coupled circuit, between generator 1 and contact 8, a direct coupling is made from the negative brush 27 of the generator 1 through coil 12 of relay 11 to ground through the main contactor 6. This circuit will detect any voltage build-up on the generator interpole and compensating windings and will signal the fault relay 11 to close the circuit 14 to 17. A set of normally closed contacts 34 and 35 open and close the directly coupled circuit as required. During the generator build-up period when the feeder line 4 is disconnected from bus 5 by main contactor 6, the directly coupled circuit is completed through line 29 and detects any ground faults. During the period when load current flows to the bus and the main contactor is closed the directly coupled circuit is opened between contacts 34 and 35 by the coil 10 and only the protection afforded by the current transformer or indirectly coupled circuit is utilized.

The current transformers and the fault detection relay are designed with specific resistance and inductance relative to each other, such that ground faults which produce various rates of current build-up can be detected. This combination of impedance matching provides an optimum value in sensitivity to detect all fault currents under normal operating conditions.

The actual operation of the fault relay itself upon the receipt of a signal either from the direct or indirectly coupled circuits is as follows: When the contact arm 14 closes the circuit 15 upon actuation by either coil 12 or 13, the field trip coil 20 will be energized and the normally closed relay contacts 30 will open to break the shunt field circuit of the generator 1, thereby deenergizing the shunt field of the generator.

From the foregoing, it will be seen that there has been provided an improved fault protection system for generators and the systems fed thereby both during the build-up periods and running periods of the generator.

I claim:

1. A ground fault protection system for a generator powered electrical system comprising means for deenergizing the shunt field of the generator, means for actuating said deenergizing means during the build-up period of the generator and separate means for actuating said deenergizing means during normal running periods of the generator, both of said last means being responsive only to ground faults occurring in the system for causing the actuation of the deenergizing means.

2. A ground fault protection system for a generator powered electrical system comprising means for deenergizing the shunt field of the generator, directly coupled means for controlling the actuation of the deenergizing means upon the occurrence of a ground fault in the electrical system during the build-up period of the generator and indirectly coupled means for controlling the actuation of the deenergizing means upon the occurrence of a ground fault in the electrical system during normal running periods of the generator.

3. A ground fault protection system for a generator powered electrical system, comprising circuit means for deenergizing the shunt field of the generator, a fault responsive relay for closing the normally open circuit of the deenergizing means, direct coupling means connecting the relay with the electrical system to operate the relay and thereby the deenergizing means in response to faults occurring in the electrical system during the build-up period of the generator and indirect coupling means connecting the relay with said electrical system to operate the relay and thereby the deenergizing means in response to faults occurring in the electrical system during normal running periods of the generator.

4. A ground fault protection system for a generator powered electrical system comprising means for connecting said generator to a bus, means for deenergizing the shunt field of said generator, means directly coupled to the generator for actuating the deenergizing means upon the occurrence of a ground fault in the electrical system during the build-up period of the generator with said connecting means being in open circuit condition and means indirectly coupled to both sides of the generator for actuating the deenergizing means upon the occurrence of a ground fault in the electrical system during normal running periods of the generator with the connecting means in closed circuit condition.

5. A ground fault protection system for a generator powered electrical system comprising means for connecting said generator to a bus, means for deenergizing the shunt field of said generator, means directly coupled to the generator for actuating the deenergizing means upon the occurrence of a ground fault in the electrical system during the build-up period of the generator with said connecting means being in open circuit condition and means indirectly coupled to both sides of the generator for actuating the deenergizing means upon the occurrence of a ground fault in the electrical system during normal running periods of the generator with the connecting means in closed circuit condition, the said directly coupled means being open circuited by the closure of said connecting means at the termination of the generator build-up period.

References Cited in the file of this patent
UNITED STATES PATENTS

| | | |
|---|---|---|
| 1,658,704 | Camhy | Feb. 7, 1928 |
| 2,534,985 | Austin et al. | Dec. 19, 1950 |
| 2,666,871 | Austin et al. | Jan. 19, 1954 |
| 2,666,872 | Austin et al. | Jan. 19, 1954 |